United States Patent
Koizumi et al.

(10) Patent No.: US 10,076,966 B2
(45) Date of Patent: Sep. 18, 2018

(54) CONTACTLESS POWER TRANSMISSION DEVICE, CONTACTLESS POWER RECEPTION DEVICE, AND CONTACTLESS POWER TRANSMISSION SYSTEM

(71) Applicant: Panasonic Intellectual Property Management Co., Ltd., Osaka (JP)

(72) Inventors: Masayoshi Koizumi, Kanagawa (JP); Osamu Ohashi, Kanagawa (JP); Tomohiro Ota, Hyogo (JP); Takeshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/301,857

(22) PCT Filed: Apr. 1, 2015

(86) PCT No.: PCT/JP2015/001878
§ 371 (c)(1),
(2) Date: Oct. 4, 2016

(87) PCT Pub. No.: WO2015/162859
PCT Pub. Date: Oct. 29, 2015

(65) Prior Publication Data
US 2017/0126067 A1     May 4, 2017

(30) Foreign Application Priority Data
Apr. 23, 2014   (JP) ................................. 2014-089110

(51) Int. Cl.
*H02J 50/80*   (2016.01)
*B60L 11/18*   (2006.01)
(Continued)

(52) U.S. Cl.
CPC ......... *B60L 11/182* (2013.01); *B60L 11/1824* (2013.01); *H02J 7/0027* (2013.01);
(Continued)

(58) Field of Classification Search
CPC ............................... H02J 50/12; B60L 11/182
See application file for complete search history.

(56) References Cited

U.S. PATENT DOCUMENTS

2013/0035814 A1* 2/2013 Boyer ................. B60L 11/1816
                                                    701/22
2014/0152117 A1* 6/2014 Sankar ..................... H03H 7/40
                                                    307/104

FOREIGN PATENT DOCUMENTS

JP        2013-153627        8/2013

OTHER PUBLICATIONS

International Search Report of PCT application No. PCT/JP2015/001878 dated Jun. 30, 2015.

* cited by examiner

*Primary Examiner* — Jeffrey Shin
(74) *Attorney, Agent, or Firm* — McDermott Will & Emery LLP

(57) ABSTRACT

This contactless power transmission device transmits power to a contactless power reception device having a reception-side coil and a reception-side resonator which resonates with the reception-side coil. The contactless power transmission device has a transmission unit including a transmission-side coil, a transmission-side resonator which resonates with the transmission-side coil, and an inverter for feeding power to the transmission-side resonator. The inductance value of the transmission-side coil and/or the capacitance value of the transmission-side resonator is set so that the frequency range in which the phase difference of a primary-side current flowing through the transmission unit relative to a primary-
(Continued)

side voltage applied to the transmission unit is zero or above is wider than when the inductance value of the reception-side coil are equal to each other as are the capacitance value of the reception-side resonator and the capacitance value of the transmission-side resonator.

17 Claims, 9 Drawing Sheets

(51) Int. Cl.
*H02J 7/00* (2006.01)
*H02J 50/12* (2016.01)
*H02J 7/02* (2016.01)

(52) U.S. Cl.
CPC .............. *H02J 7/025* (2013.01); *H02J 50/12* (2016.02); *H02J 50/80* (2016.02); *B60L 2230/10* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

CONTACTLESS POWER TRANSMISSION DEVICE, CONTACTLESS POWER RECEPTION DEVICE, AND CONTACTLESS POWER TRANSMISSION SYSTEM

CROSS-REFERENCE TO RELATED APPLICATIONS

This application is a U.S. national stage application of the PCT International Application No. PCT/JP2015/001878 filed on Apr. 1, 2015, which claims the benefit of foreign priority of Japanese patent application No. 2014-089110 filed on Apr. 23, 2014, the contents all of which are incorporated herein by reference.

FIELD OF THE INVENTION

The present invention relates to a contactless power transmission device, a contactless power reception device, and a contactless power transmission system.

DESCRIPTION OF THE RELATED ART

Recently, an automobile (simply below referred to as "a vehicle") such as an electric vehicle (EV), and a plug-in hybrid electric vehicle (PHEV), which travels by using electricity is propagated.

Such a vehicle has a high capacity storage battery mounted therein. Electric energy transmitted from the outside of the vehicle is accumulated in the storage battery, and the vehicle travels by using the accumulated electric energy.

As a method of performing transmission to the storage battery of a vehicle from the outside thereof, for example, PTL 1 and the like disclose a method of performing contactless power transmission between a primary side coil of a power transmission device provided on the ground side, and a secondary side coil of a power reception device provided on the vehicle side, by using an electromagnetic force.

PTL 1 discloses a contactless power transmission circuit in which an inverter is operated in a region in which a frequency is higher than a resonant frequency fe, for example, in order to reduce a switching loss occurring by a soft-switching operation of the inverter.

Here, the region in which a frequency is higher than the resonant frequency fe is referred to as a region in which the phase of a primary side current is delayed from that of a primary side voltage.

As described above, in the contactless power transmission, generally, the inverter is operated when the phase (current-voltage phase difference) of the primary side current is delayed with respect to the phase of the primary side voltage (below referred to as "phase delay").

This is because, if the inverter is operated when the phase of the primary side current is advanced rather than the phase of the primary side voltage (below referred to as "phase advance"), hard switching occurs at the inverter portion and thus a power element may be broken.

In a case where the inductance value L1 of the primary side coil is equal to the inductance value L2 of the secondary side coil, and the capacitance value C1 of a primary side capacitor is equal to the capacitance value C2 of a secondary side capacitor, a region from the resonant frequency fm to a resonance point (valley of bimodality) corresponds to a phase delay region, and a region from the resonance point to the resonant frequency fe corresponds to a phase advance region.

CITATION LIST

Patent Literature

PTL 1: Japanese Patent Unexamined Publication No. 2013-153627

SUMMARY OF THE INVENTION

The present invention provides a contactless power transmission device, a contactless power reception device, and a contactless power transmission system which improve the degree of freedom in selection of a driving frequency.

A contactless power transmission device according to an aspect of the present invention transmits power to a contactless power reception device. The contactless power reception device includes a power reception side coil and a power reception-side resonator which resonates with the power reception side coil. The contactless power transmission device includes a power transmission unit. The power transmission unit includes a power transmission side coil, a transmission-side resonator which resonates with the power transmission side coil, and an inverter which supplies power to the transmission-side resonator. At least one of an inductance value of the power transmission side coil and a capacitance value of the power transmission-side resonator is set such that a frequency range in which a phase difference of a primary side current flowing in the power transmission unit with respect to a primary side voltage applied to the power transmission unit is equal to or more than 0 is wider than the frequency range in a case where an inductance value of the power reception side coil is equal to the inductance value of the power transmission side coil and a capacitance value of the power reception-side resonator is equal to the capacitance value of the power transmission-side resonator A contactless power transmission device according to another aspect of the present invention transmits power to a contactless power reception device. The contactless power reception device includes a power reception side coil and a power reception-side resonator which resonates with the power reception side coil. The contactless power transmission device includes a power transmission unit which includes a power transmission side coil, a transmission-side resonator which resonates with the power transmission side coil, and an inverter which supplies power to the transmission-side resonator, and a controller that controls an inductance value of the power transmission side coil and/or a capacitance value of the power transmission-side resonator. The controller controls at least one of the inductance value of the power transmission side coil and the capacitance value of the power transmission-side resonator such that a frequency range in which a phase difference of a primary side current flowing in the power transmission unit with respect to a primary side voltage applied to the power transmission unit is equal to or more than 0 becomes wider.

A contactless power reception device according to still another aspect of the present invention receives power from a contactless power transmission device. The contactless power transmission device includes a power transmission unit which includes a power transmission side coil, a transmission-side resonator which resonates with the power transmission side coil, and an inverter which supplies power to the transmission-side resonator. The contactless power reception device includes a power reception side coil and a power reception-side resonator which resonates with the power reception side coil. At least one of an inductance value of the power reception side coil and a capacitance value of the power reception-side resonator is set such that a frequency range in which a phase difference of a primary side current flowing in the power transmission unit with respect to a primary side voltage applied to the power transmission unit is equal to or more than 0 is wider than the frequency range in a case where the inductance value of the power reception side coil is equal to an inductance value of the power transmission side coil and the capacitance value of the power reception-side resonator is equal to a capacitance value of the power transmission-side resonator.

A contactless power reception device according to still another aspect of the present invention receives power from a contactless power transmission device. The contactless power transmission device includes a power transmission unit which includes a power transmission side coil, a transmission-side resonator which resonates with the power transmission side coil, and an inverter which supplies power to the transmission-side resonator. The contactless power reception device includes a power reception side coil, a power reception-side resonator which resonates with the power reception side coil, and a controller which controls an inductance value of the power reception side coil and/or a capacitance value of the power reception-side resonator. The controller controls at least one of the inductance value of the power reception side coil and the capacitance value of the power reception-side resonator such that a frequency range in which a phase difference of a primary side current flowing in the power transmission unit with respect to a primary side voltage applied to the power transmission unit is equal to or more than 0 becomes wider.

According to the present invention, it is possible to improve the degree of freedom in selection of a driving frequency.

DETAILED DESCRIPTION OF THE PREFERRED EMBODIMENTS

Figure 1:
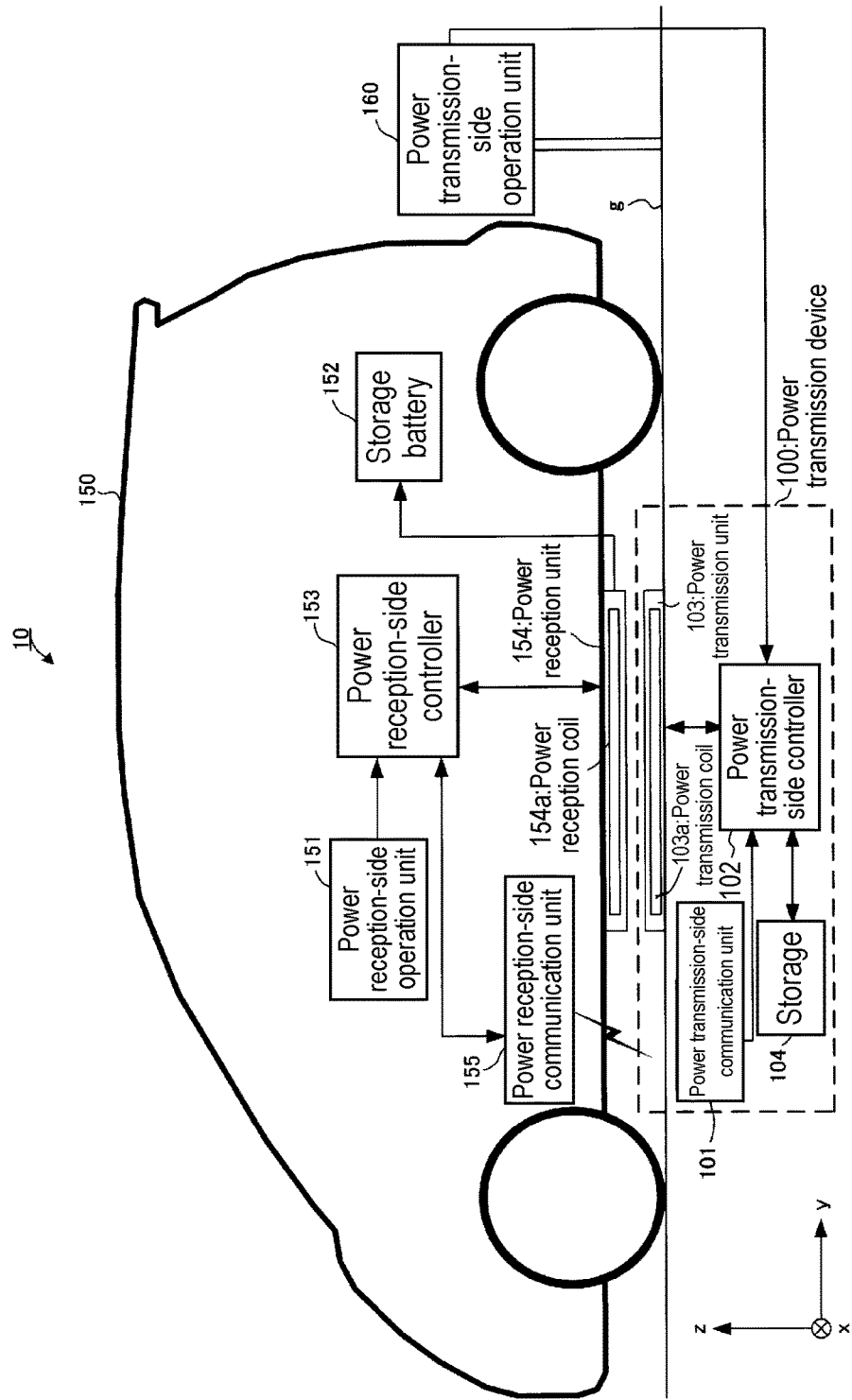
FIG. 1 is a block diagram illustrating a configuration of a charging system according to Embodiment 1 of the present invention.

Before exemplary embodiments of the present invention will be described, problems in the contactless power transmission of the related art will be simply described.

In the contactless power transmission of the related art, a gap, axis deviation, a state of charge (SOC), and the like easily change power transmission conditions, and the change causes a phase difference between a primary side current and a primary side voltage to be also changed.

Thus, even when a frequency is a driving frequency in a phase delay region, in an ideal state (in a state where a position is not shifted), the frequency may be in a phase advance region.

A strict restriction condition is applied in order to avoid a phase advance mode (operation in the phase advance region), and a free selection of a driving frequency is not possible.

Hereinafter, exemplary embodiments of the present invention will be described in detail with reference to the drawings.

Exemplary Embodiment 1

A configuration of charging system 10 according to Exemplary embodiment 1 of the present invention will be described with reference to FIG. 1.

Charging system 10 includes power transmission device 100, vehicle 150, and power transmission-side operation unit 160.

FIG. 1 illustrates a state where power transmission coil 103a and power reception coil 154a face each other so as to enable power transmission.

Power transmission device 100 is installed on the ground or buried in the ground, so as to cause power transmission unit 103 to be exposed from the surface g of the earth.

Power transmission device 100 is provided in a parking space, for example. When vehicle 150 is parked, power transmission device 100 is positioned to face power reception unit 154, and thus transmits power to power reception unit 154.

Here, power transmission refers to an operation that power is supplied to power reception coil 154*a* from power transmission coil 103*a*.

A configuration of power transmission device 100 will be described later.

Vehicle 150 is, for example, an automobile which is referred to as an electric vehicle (EV) or a plug-in electric vehicle (PEV), and travels by using power of storage battery 152.

A configuration of vehicle 150 will be described later.

An operation from the outside of vehicle 150 causes power transmission-side operation unit 160 to output a power-transmission start signal or a power-transmission stop signal to power transmission device 100. The power-transmission start signal indicates a start of power transmission, and the power-transmission stop signal indicates stop of the power transmission.

<Configuration of Vehicle>

Vehicle 150 is mainly configured from power reception-side operation unit 151, storage battery 152, power reception-side controller 153, power reception unit 154, and power reception-side communication unit 155.

Power reception-side operation unit 151 receives various operations from a user, and outputs various signals depending on the received operation, to power reception-side controller 153.

Storage battery 152 accumulates power which has been supplied from power transmission device 100 through power reception unit 154.

Power reception-side controller 153 controls power reception unit 154 and power reception-side communication unit 155 to perform various types of processing which relates to charging, or to perform various types of processing which relates to charging stop, based on the various signals which have been input from power reception-side operation unit 151 and power reception unit 154.

Power reception-side controller 153 transmits and receives various types of information to and from power transmission-side controller 102 of power transmission device 100 through power reception-side communication unit 155.

Power reception unit 154 includes power reception coil 154*a*.

Power reception coil 154*a* is, for example, a spiral coil. Power reception coil 154*a* receives power which is transmitted from power transmission coil 103*a* of power transmission unit 103.

Power reception unit 154 supplies power received by power reception coil 154*a* to storage battery 152 in accordance with a control of power reception-side controller 153.

Power reception unit 154 is provided in a state of being exposed to the outside of vehicle 150, in the bottom of vehicle 150.

Power reception-side communication unit 155 generates a charging permission signal for permitting charging, or a charging nonpermission signal for forbidding charging, in accordance with a control of power reception-side controller 153. Power reception-side communication unit 155 transmits the charging permission signal or the charging nonpermission signal which has been generated, to power transmission-side communication unit 101.

Here, the charging nonpermission signal is transmitted, for example, in a case where a position shift is detected during power transmission, or in a case where storage battery 152 is in a state of being fully charged.

<Configuration of Power Transmission Device>

Power transmission device 100 is mainly configured from power transmission-side communication unit 101, power transmission-side controller 102, power transmission unit 103, and storage 104.

Power transmission-side communication unit 101 receives the charging permission signal or the charging nonpermission signal from power reception-side communication unit 155, and outputs the charging permission signal or the charging nonpermission signal which has been received, to power transmission-side controller 102.

In a case where the power-transmission start signal is input from power transmission-side operation unit 160 and the charging permission signal is input from power transmission-side communication unit 101, power transmission-side controller 102 controls power transmission unit 103 to try power transmission to power reception coil 154*a* while sequentially changing a frequency for power transmission coil 103*a*.

When power transmission is performed on trial, power transmission-side controller 102 obtains a phase difference of a primary side current with respect to a primary side voltage for each frequency, based on the primary side current which flows in power transmission unit 103, and the primary side voltage which is applied to power transmission unit 103. Power transmission-side controller 102 stores the obtained phase difference in storage 104.

Power transmission-side controller 102 selects a frequency which is drivable at the phase delay region, based on the phase difference of the primary side current with respect to the primary side voltage for each frequency, which has been stored in storage 104. Power transmission-side controller 102 controls power transmission unit 103 to start main power transmission by using the selected frequency.

In a case where the power-transmission stop signal is input from power transmission-side operation unit 160, or in a case where the charging nonpermission signal is input from power transmission-side communication unit 101, power transmission-side controller 102 controls power transmission unit 103 not to start power transmission or to stop the power transmission.

Power transmission-side controller 102 transmits and receives various types of information to and from power reception-side controller 153 of vehicle 150 through power transmission-side communication unit 101.

Power transmission unit 103 includes power transmission coil 103*a*. Power transmission coil 103*a* is, for example, a spiral coil.

Power transmission unit 103 performs power transmission on trial by using power transmission coil 103*a* while sequentially changing a frequency, in accordance with a control of power transmission-side controller 102. Power transmission unit 103 performs main power transmission at the determined driving frequency.

Power transmission unit 103 transmits power by using, for example, an electromagnetic induction method, an electric resonance method, or a magnetic resonance method.

Storage 104 stores the phase difference for each frequency, which has been output from power transmission-side controller 102.

<Detailed Configuration of Power Transmission Unit and Power Reception Unit>

Next, an internal configuration of above-described power transmission unit 103 and power reception unit 154 will be described.

Figure 2:
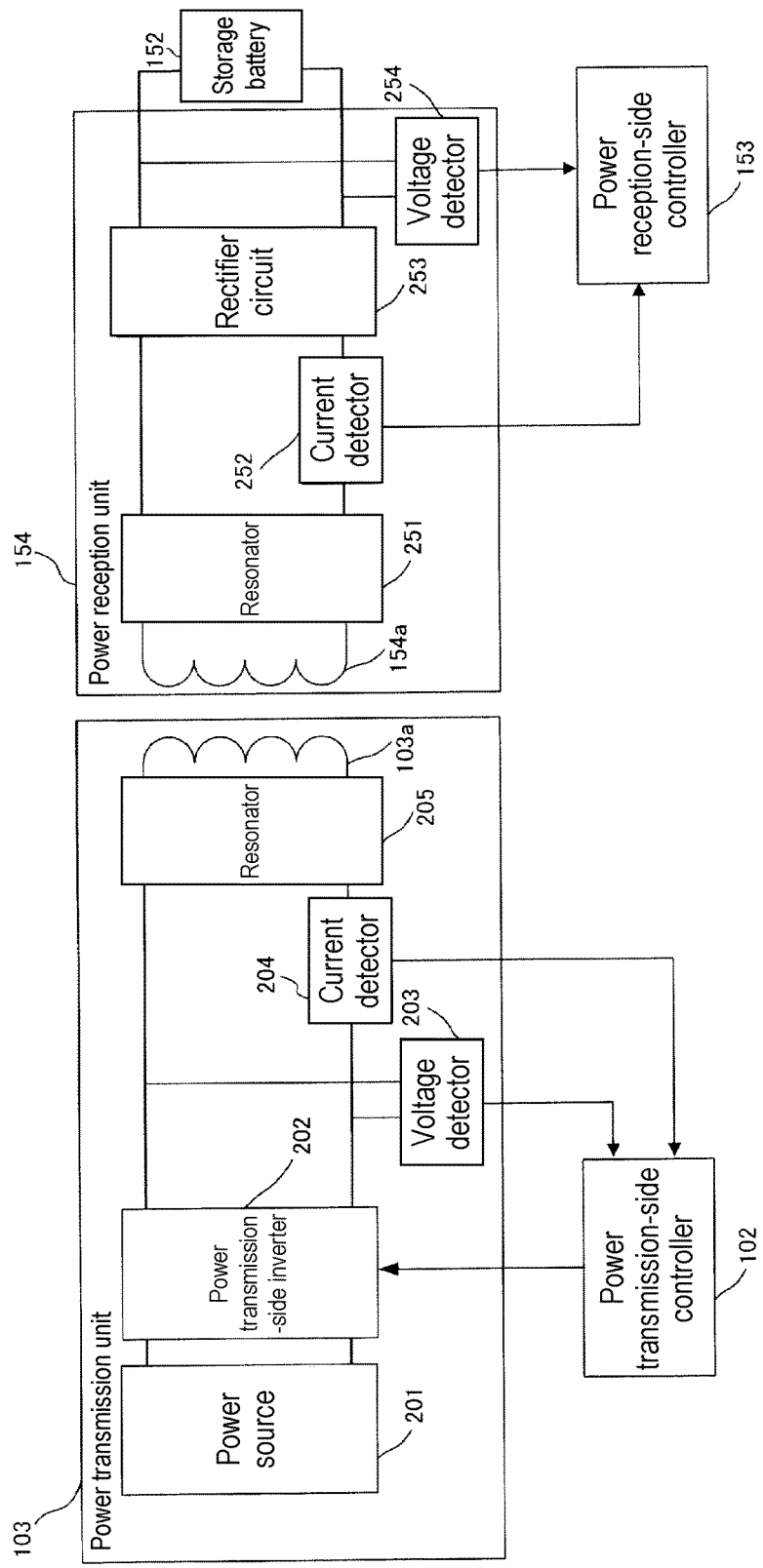
FIG. 2 is a block diagram illustrating an internal configuration of a power transmission unit and a power reception unit illustrated in FIG. 1.

FIG. 2 is a block diagram illustrating an internal configuration of power transmission unit 103 and power reception unit 154 illustrated in FIG. 1.

Power transmission unit 103 includes power source 201, power transmission-side inverter 202, voltage detector 203, current detector 204, resonator 205, and power transmission coil 103a.

Power source 201 supplies DC power having a predetermined voltage and a predetermined current to power transmission-side inverter 202.

Power transmission-side inverter 202 converts the DC power which has been supplied from power source 201, into AC power and supplies the converted AC power to resonator 205 and power transmission coil 103a, in accordance with a control of power transmission-side controller 102.

Voltage detector 203 detects a voltage value of the AC power which has been supplied to resonator 205 from power transmission-side inverter 202, and outputs the detected voltage value to power transmission-side controller 102.

Power transmission-side controller 102 obtains a phase of the primary side voltage based on the voltage value which has been output from voltage detector 203.

Current detector 204 detects a current value of the AC power which has been supplied to resonator 205 from power transmission-side inverter 202, and outputs the detected current value to power transmission-side controller 102.

Power transmission-side controller 102 obtains a phase of the primary side current based on the current value which has been output from current detector 204.

Voltage detector 203 and current detector 204 may detect a voltage value and a current value of power supplied to power transmission-side inverter 202.

Resonator 205 is a capacitor which has, for example, a capacitance value C1, and resonates with power transmission coil 103a.

Power transmission coil 103a receives the supply of the AC power by power transmission-side inverter 202, and thus resonates with resonator 205 and transmits power to power reception coil 154a.

Power transmission coil 103a is defined to have an inductance value L1.

Power reception unit 154 includes power reception coil 154a, resonator 251, current detector 252, rectifier circuit 253, and voltage detector 254.

Power reception coil 154a receives an electromagnetic field (including magnetic flux) occurring by power transmission coil 103a of power transmission unit 103, generates an electromotive force, and then supplies the generated electromotive force to resonator 251.

Power reception coil 154a is defined to have an inductance value L2.

A current generated by the electromotive force is referred below to as a power reception-side coil current.

Resonator 251 is a capacitor which has, for example, a capacitance value C2, and resonates with power reception coil 154a.

Current detector 252 detects a current value of the power supplied from power reception coil 154a, and outputs detected current value to power reception-side controller 153.

Power reception-side controller 153 obtains a phase of the power reception-side coil current based on the current value which has been output from current detector 252.

Rectifier circuit 253 rectifies the power reception-side coil current which has been supplied from power reception coil 154a, and supplies the current obtained by the rectification, to storage battery 152.

Voltage detector 254 detects a voltage value of the DC power which has been supplied to storage battery 152 from rectifier circuit 253, and outputs the detected voltage value to power reception-side controller 153.

Voltage detector 254 may have a configuration in which a voltage value of the power which is supplied to rectifier circuit 253 is detected.

In such power transmission unit 103 and power reception unit 154, L1C1 is defined to be a product of the capacitance value C1 of resonator 205 and the inductance value L1 of power transmission coil 103a, and L2C2 is defined to be a product of the capacitance value C2 of resonator 251 and the inductance value L2 of power reception coil 154a. L1, C1, L2, and C2 are set to cause L1C1 to be different from L2C2.

<Circuit Configuration of Charging System>

FIGS. 3A to 3D are diagrams illustrating equivalent circuits of power transmission unit 103 and power reception unit 154 illustrated in FIG. 2.

In FIGS. 3A to 3D, Re1 indicates a resistor in power transmission unit 103, Ca1 indicates a capacitor of resonator 205 in power transmission unit 103, and Le1 indicates power transmission coil 103a.

Le2 indicates power reception coil 154a, and Re2 indicates a wiring resistor in power reception unit 154 and a resistor of rectifier circuit 253. Ca2 indicates a capacitor of resonator 251, and $R1d=Z0$ indicates storage battery (load) 152.

FIGS. 3A to 3D illustrate modification examples of a disposition of Ca1 and Ca2.

Figure 3C:
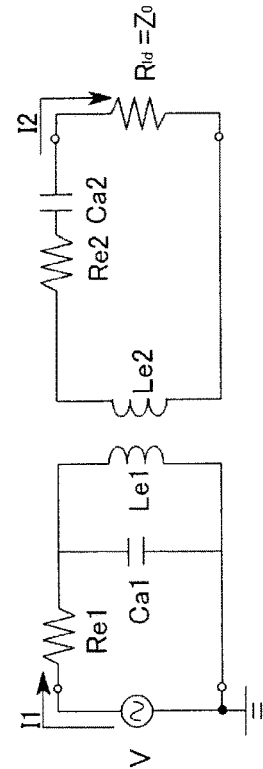
FIG. 3C is a diagram illustrating still another equivalent circuit of the power transmission unit and the power reception unit illustrated in FIG. 2.
Figure 3D:
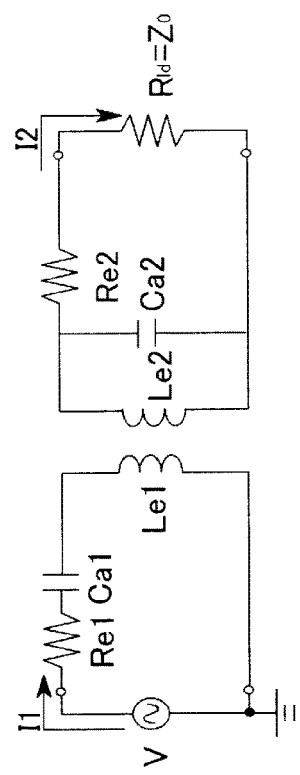
FIG. 3D is a diagram illustrating still another equivalent circuit of the power transmission unit and the power reception unit illustrated in FIG. 2.
Figure 3A:
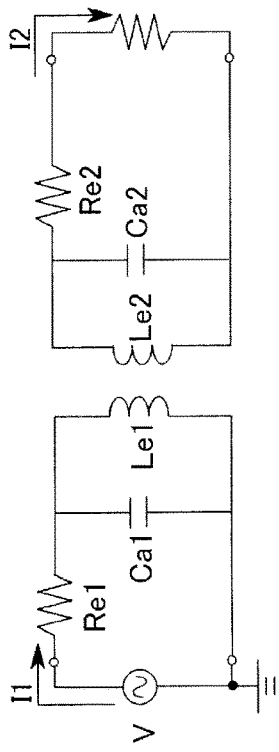
FIG. 3A is a diagram illustrating an equivalent circuit of the power transmission unit and the power reception unit illustrated in FIG. 2.
Figure 3B:
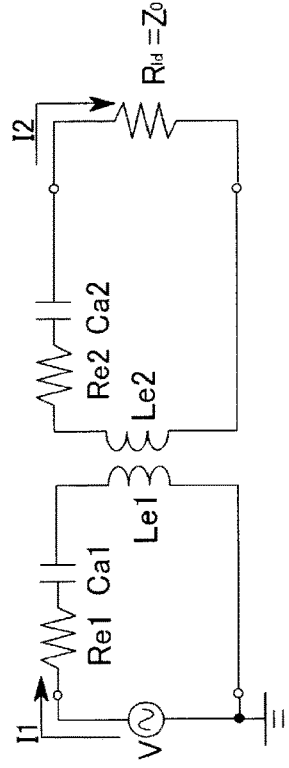
FIG. 3B is a diagram illustrating another equivalent circuit of the power transmission unit and the power reception unit illustrated in FIG. 2.

FIG. 3A illustrates a circuit configuration in which Ca1 is disposed to be in parallel with Le1, and Ca2 is disposed to be in parallel with Le2. FIG. 3B illustrates a circuit configuration in which Ca1 is disposed to be in series with Le1, and Ca2 is disposed to be in series with Le2.

FIG. 3C illustrates a circuit configuration in which Ca1 is disposed to be in parallel with Le1, and Ca2 is disposed to be in series with Le2. FIG. 3D illustrates a circuit configuration in which Ca1 is disposed to be in series with Le1, and Ca2 is disposed to be in parallel with Le2.

<Disposition of Coils>

Next, a disposition of above-described power transmission coil 103a and power reception coil 154a will be described with reference to FIGS. 4A to 4D.

FIGS. 4A to 4D illustrate a state where power transmission coil 103a and power reception coil 154a are positioned.

An x axis indicates a transverse direction of vehicle 150 (a +x direction indicates a rightward direction of vehicle 150, and a −x direction indicates a leftward direction of vehicle 150). A y axis indicates a forth-and-back direction of vehicle 150 (a +y direction indicates the rear of vehicle 150, and a −y direction indicates the front of vehicle 150). A z axis indicates a vertical direction to the ground (a +z direction indicates an upward direction of vehicle 150, and a −z direction indicates a downward direction of vehicle 150).

Figure 4C:
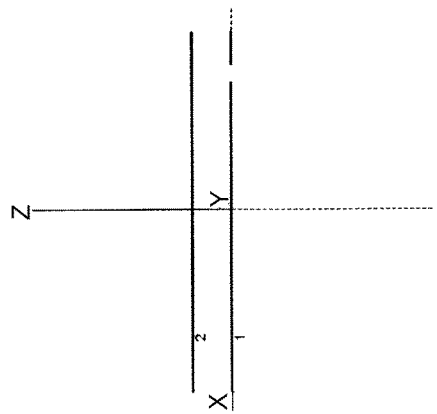
FIG. 4C is a diagram illustrating a disposition of the coils of the power transmission unit and the power reception unit illustrated in FIG. 1, in an xz plane.
Figure 4B:
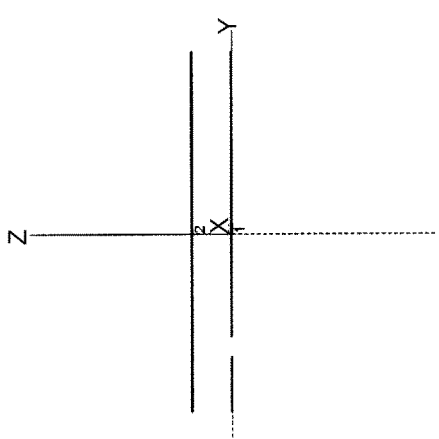
FIG. 4B is a diagram illustrating a disposition of the coils of the power transmission unit and the power reception unit illustrated in FIG. 1, in a yz plane.
Figure 4D:
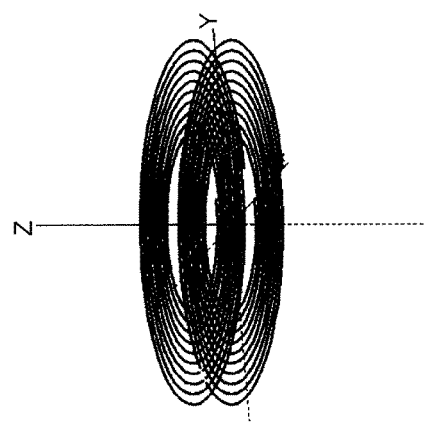
FIG. 4D is a perspective diagram illustrating a disposition of the coils of the power transmission unit and the power reception unit illustrated in FIG. 1.
Figure 4A:
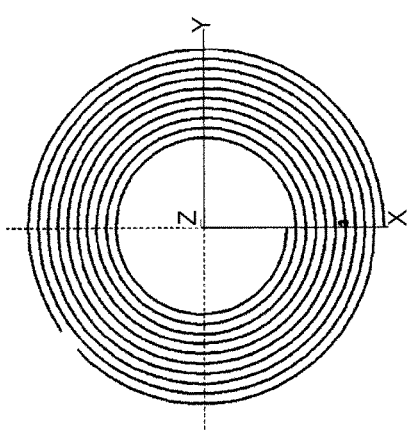
FIG. 4A is a diagram illustrating a disposition of coils of the power transmission unit and the power reception unit illustrated in FIG. 1, in an xy plane.

FIG. 4A illustrates the xy plane, FIG. 4B illustrates the yz plane, and FIG. 4C illustrates the xz plane.

FIG. 4D is a perspective view illustrating power transmission coil 103a and power reception coil 154a.

In this manner, flat spiral coils are respectively used for power transmission coil 103a and power reception coil 154a, and each of the spiral coils is disposed so as to cause a flat surface thereof to be in parallel with the ground g.

<Relationship between Phase Difference of Primary Side Current and Primary Side Voltage, Driving Frequency>

Figure 5:
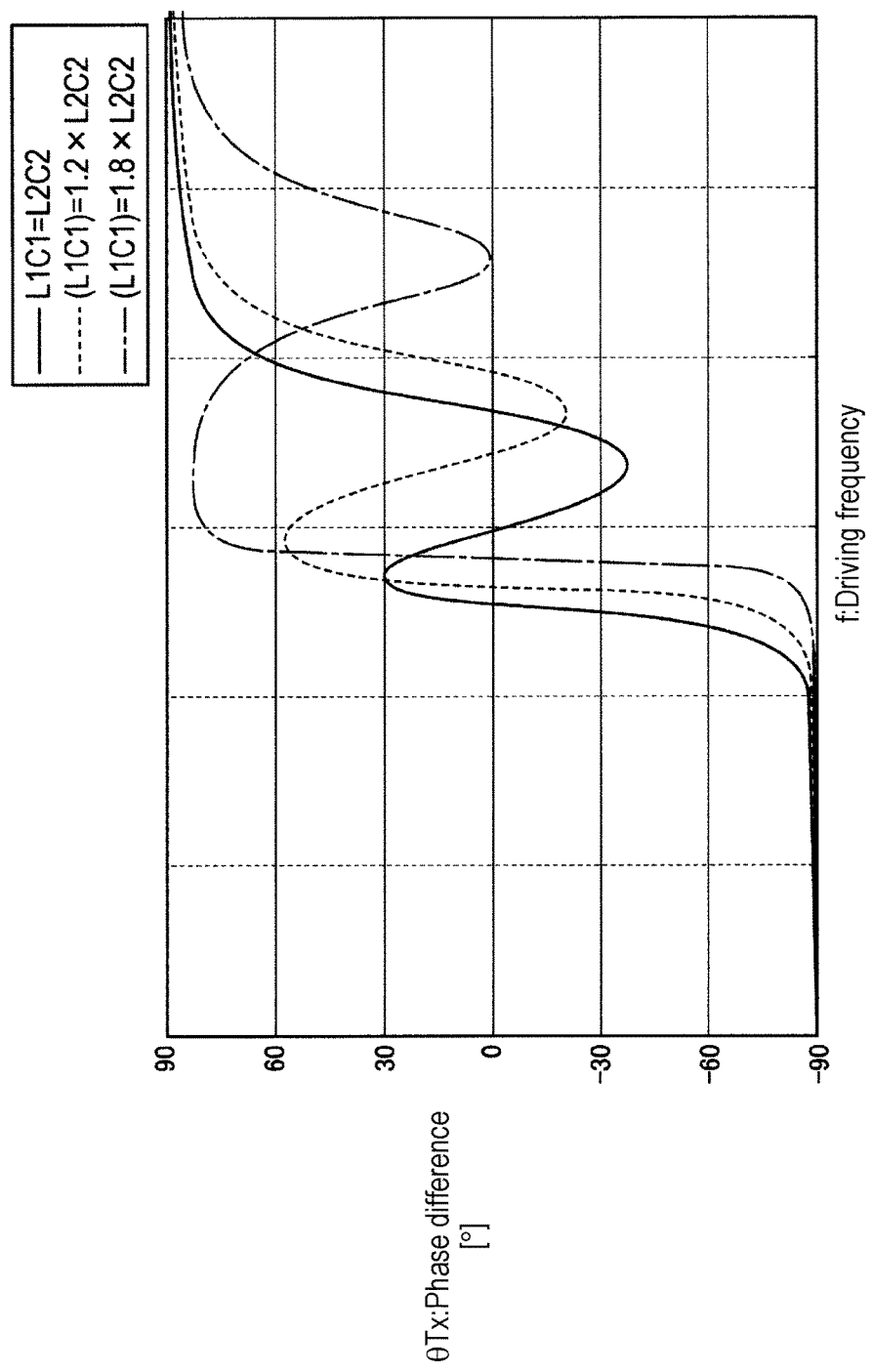
FIG. 5 is a diagram illustrating a relationship between a phase difference of a primary side current and a primary side voltage, and a driving frequency.

FIG. 5 is a diagram illustrating a relationship between the phase difference of the primary side current and the primary side voltage, and the driving frequency.

In FIG. 5, a vertical axis indicates a phase difference θTx of the primary side current and the primary side voltage, and a transverse axis indicates a driving frequency f.

A curved line indicated by a solid line indicates a relationship in a case of L1C1=L2C2 (L1=L2, and C1=C2). A curved line indicated by a dot line indicates a relationship in a case of L1C1=1.2×L2C2. A curved line indicated by one dot chain line indicates a relationship in a case of L1C1=1.8×L2C2.

An equivalent circuit model is analyzed, and thus the phase difference θTx can be expressed by the following expression (1).

$$\theta Tx = \arctan(XTx/RTx) \quad (1)$$

In the expression (1), XTx indicates a reactance component obtained by viewing from power transmission unit 103, and RTx indicates a resistance component obtained by viewing from power transmission unit 103.

The inductance value, the capacitance value, and the like are determined to cause a frequency range in which θTx≥0 is satisfied to be wider than that in the case of L1C1=L2C2 (L1=L2, and C1=C2) (in other words, set to cause a region in which the phase of the primary side current is delayed from the primary side voltage to be extended in comparison to that in the case of L1C1=L2C2 (L1=L2, and C1=C2)). Thus, it is possible to extend a region in which soft switching is enabled.

That is, the inductance value and the capacitance value are selected so as to extend the frequency range f in which θTx(f)≥0 is satisfied.

From FIG. 5, it is recognized that a relationship in which the frequency range for satisfying θTx≥0 is wide corresponds to the relationship indicated by the dot line rather than the relationship indicated by the solid line, and corresponds to the relationship indicated by the one dot chain line rather than the relationship indicated by the dot line.

Particularly, as apparent from FIG. 5, regarding the relationship indicated by the one dot chain line, the minimum value of the function is equal to or more than 0. This point contributes to extension of the frequency range in which θTx≥0 is satisfied.

Here, a selection method of the inductance value and the capacitance value will be specifically described.

Here, a case where the relationship of L1C1=1.8×L2C2 is satisfied, and thus the frequency range in which θTx≥0 is satisfied is wider than that when L1C1=L2C2 (L1=L2 and C1=C2) is satisfied will be described.

For example, L1C1=1.8×L2C2 is realized in such a manner that the inductance value L1 of power transmission coil 103a is set to be equal to the inductance value L2 of power reception coil 154a (L1=L2), and the capacitance value C1 of resonator 205 is set to be different from the capacitance value C2 of resonator 251 (having the relationship of C1=1.8×C2).

More specifically, for example, in a case where L1=L2 is set, and L1, L2, and C2 are fixed (not changed), the capacitance value C1 of resonator 205 is set to satisfy C1=1.8×C2. Thus, L1C1=1.8×L2C2 is realized.

In a case where L1=L2 is set, and L1, L2, and C1 are fixed (not changed), the capacitance value C2 of resonator 251 is set to satisfy C2=C1/1.8. Thus, L1C1=1.8×L2C2 is realized.

L1C1=1.8×L2C2 may be realized in such a manner that the capacitance value C1 of resonator 205 is set to be equal to the capacitance value C2 of resonator 251 (C1=C2), and the inductance value L1 of power transmission coil 103a is set to be different from the inductance value L2 of power reception coil 154a (having the relationship of (L1=1.8×L2).

More specifically, for example, in a case where C1=C2 is set, and C1, C2, and L2 are fixed (not changed), the inductance value L1 of power transmission coil 103a is set to satisfy L1=1.8×L2. Thus, L1C1=1.8×L2C2 is realized.

In a case where C1=C2 is set, and C1, C2, and L1 are fixed (not changed), the inductance value L2 of power reception coil 154a is set to satisfy L2=L1/1.8. Thus, L1C1=1.8×L2C2 is realized.

L1C1=1.8×L2C2 may be realized in such a manner that the inductance value L1 of power transmission coil 103a is set to be different from the inductance value L2 of power reception coil 154a (L1≠L2), and the capacitance value C1 of resonator 205 is set to be different from the capacitance value C2 of resonator 251 (C1≠C2).

The above-described selection method of the inductance value and the capacitance value is just an example. The inductance value and the capacitance value may be selected by using other various methods, so as to cause the frequency range f in which θTx(f)≥0 is satisfied to be extended.

In this manner, according to Exemplary embodiment 1, in power transmission unit 103 and power reception unit 154, the capacitance value C1 of resonator 205, the inductor L1 of power transmission coil 103a, the capacitance value C2 of resonator 251, and the value of the inductor L2 of power reception coil 154a are set so as to cause the frequency range in which the phase difference θTx between the primary side current and the primary side voltage is equal to or more than 0 to be extended. Thus, it is possible to improve the degree of freedom in selection of a driving frequency which is drivable in the phase delay region.

Particularly, as illustrated by the curved line (L1C1=1.8×L2C2) which is indicated by the one dot chain line in FIG. 5, the capacitance value C1 of resonator 205, the inductor L1 of power transmission coil 103a, the capacitance value C2 of resonator 251, and the value of the inductor L2 of power reception coil 154a are set so as to cause the minimum value to be equal to or more than 0. Thus, the vicinity of the resonant frequency on a low frequency side is easily used as the driving frequency.

That is, in a case where the driving frequency is set, considering that a frequency is sequentially changed (swept) from a high frequency to a low frequency, a state where a region in which driving in the phase advance mode is performed (region in which hard switching is performed) is not provided in an area to the vicinity of the resonant frequency on the low frequency side, that is, a state where the minimum value is equal to or more than 0 is preferable.

Exemplary Embodiment 2

Figure 6:
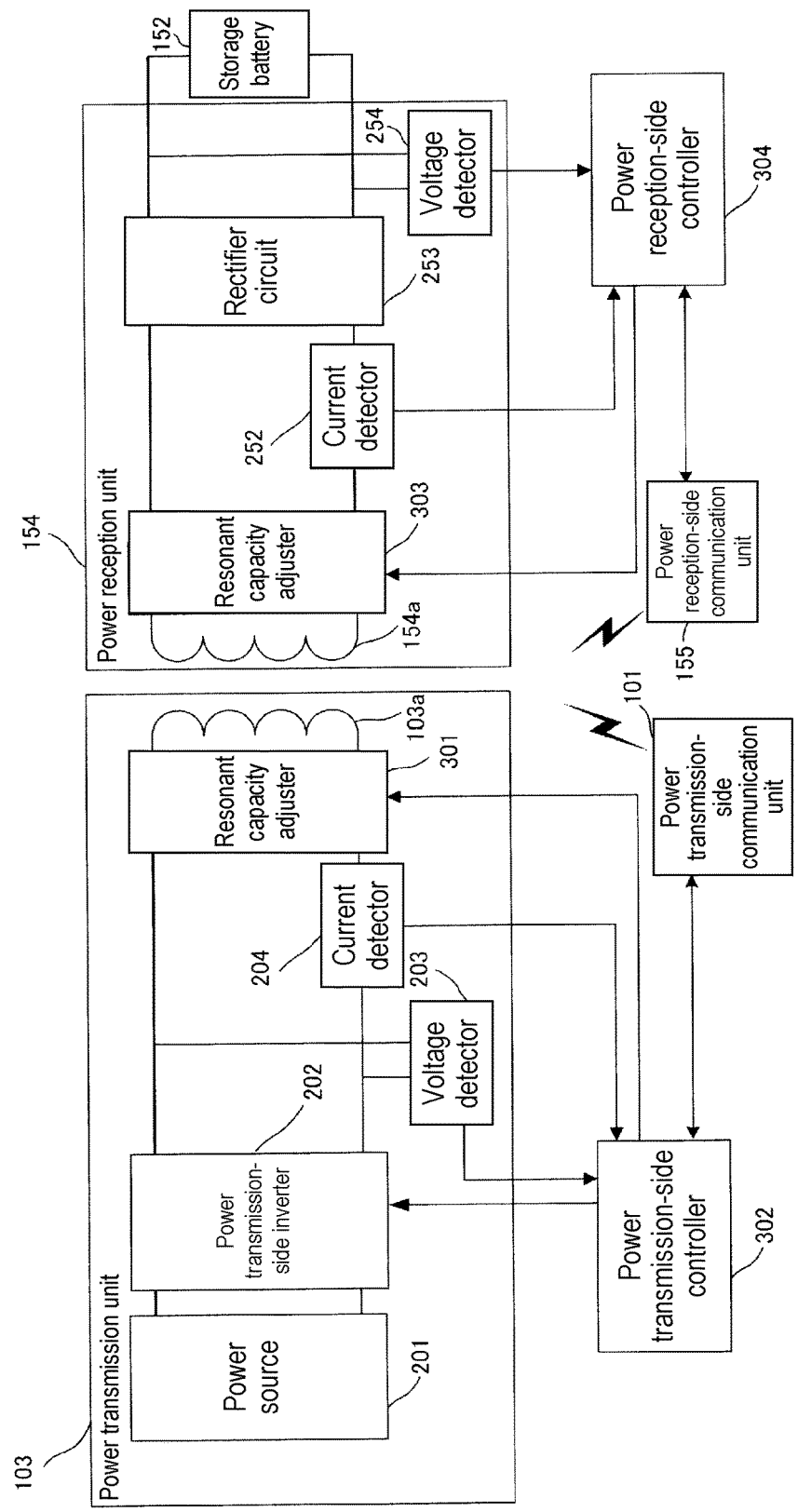
FIG. 6 is a block diagram illustrating an internal configuration of a power transmission unit and a power reception unit according to Embodiment 2 of the present invention.

FIG. 6 is a block diagram illustrating an internal configuration of power transmission unit 103 and power reception unit 154 according to Exemplary embodiment 2 of the present invention.

FIG. 6 is different from FIG. 2 in that resonator 205 is replaced with resonant capacity adjuster 301, resonator 251 is replaced with resonant capacity adjuster 303, power transmission-side controller 102 is replaced with power transmission-side controller 302, and power reception-side controller 153 is replaced with power reception-side controller 304.

The resonant capacity adjuster 301 is, for example, a variable capacitor which resonates with power transmission coil 103a.

When power transmission is performed on trial, power transmission-side controller 302 obtains a phase difference of a primary side current with respect to a primary side voltage for each frequency, based on the primary side current which flows in power transmission unit 103, and the primary side voltage which is applied to power transmission unit 103. Power transmission-side controller 302 stores the obtained phase difference in storage 104.

Power transmission-side controller 302 adjusts the capacitance value C1 of resonant capacity adjuster 301.

Power transmission-side controller 302 notifies power reception-side controller 304 of the phase difference for each frequency, which has been stored in storage 104, the adjusted capacitance value of resonant capacity adjuster 301, and the like through power transmission-side communication unit 101 and power reception-side communication unit 155.

Power transmission-side controller 302 also has the same function as power transmission-side controller 102.

Resonant capacity adjuster 303 is, for example, a variable capacitor which resonates with power reception coil 154a.

Power reception-side controller 304 adjusts the capacitance value C2 of resonant capacity adjuster 303.

Power reception-side controller 304 also has the same function as power reception-side controller 153.

Here, adjusting of capacitance values of resonant capacity adjuster 301 and/or resonant capacity adjuster 303 will be described.

Descriptions will be made on the assumption that the capacitance value C1 of the variable capacitor in resonant capacity adjuster 301 is equal to the capacitance value C2 of the variable capacitor in resonant capacity adjuster 303 in an initial state.

That is, descriptions will be made on the assumption that L1C1=L2C2 (L1=L2 and C1=C2) is set in the initial state.

Firstly, a case where the capacitance value C1 of the variable capacitor in resonant capacity adjuster 301 is changed will be described.

Power transmission-side controller 302 controls power transmission unit 103 to try power transmission to power reception coil 154a while sequentially changing a frequency for power transmission coil 103a.

When power transmission is performed on trial, power transmission-side controller 302 obtains a phase difference of a primary side current from a primary side voltage for each frequency, based on the primary side current which flows in power transmission unit 103, and the primary side voltage which is applied to power transmission unit 103. Power transmission-side controller 302 stores the obtained phase difference in storage 104.

Then, power transmission-side controller 302 adjusts the capacitance value C1 of resonant capacity adjuster 301.

For example, adjustment is performed so as to satisfy C1=1.2×C2 (the capacitance value C2 may be acquired through power reception-side communication unit 155 and power transmission-side communication unit 101, and C1=1.2×initial state C1 may be set).

Power transmission-side controller 302 controls power transmission unit 103 to try power transmission to power reception coil 154a while sequentially changing a frequency for power transmission coil 103a, again. Power transmission-side controller 302 obtains the phase difference of the primary side current from the primary side voltage, for each frequency, and stores the obtained phase difference in storage 104.

Power transmission-side controller 302 repeats to adjust the capacitance value C1 of resonant capacity adjuster 301, and to calculate and store the phase difference of the primary side current from the primary side voltage for each frequency.

For example, the capacitance value C1 is adjusted so as to be four values of 1.2×C2, 1.8×C2, C2/1.2, and C2/1.8, and the phase difference of the primary side current with respect to the primary side voltage is calculated for each frequency.

Then, regarding phase differences of the primary side current with respect to the primary side voltage for frequencies, which have been stored in storage 104, power transmission-side controller 302 specifies a capacitance value which causes the frequency range in which $\theta Tx \geq 0$ is satisfied to be widest. Power transmission-side controller 302 adjusts the capacitance value C1 of resonant capacity adjuster 301 so as to be equal to the specified capacitance value.

Thus, when the capacitance value is adjusted so as to be the capacitance value C1 which causes the frequency range in which the phase difference $\theta Tx$ is equal to or more than 0 to become wide, it is possible to improve the degree of freedom in selection of a driving frequency which is drivable in the phase delay region.

Next, a case where the capacitance value C2 of the variable capacitor in resonant capacity adjuster 303 is changed will be described.

Power transmission-side controller 302 controls power transmission unit 103 to try power transmission to power reception coil 154a while sequentially changing a frequency for power transmission coil 103a. When power transmission is performed on trial, power transmission-side controller 302 obtains a phase difference of a primary side current with respect to a primary side voltage for each frequency, based on the primary side current which flows in power transmission unit 103, and the primary side voltage which is applied to power transmission unit 103. Power transmission-side controller 302 stores the obtained phase difference in storage 104.

Next, power transmission-side controller 302 instructs power reception-side controller 304 to adjust the capacitance value C2 of resonant capacity adjuster 303 through power transmission-side communication unit 101 and power reception-side communication unit 155.

Power reception-side controller 304 adjusts the capacitance value C2 of resonant capacity adjuster 303 to satisfy, for example, C2=1.2×C1 (the capacitance value C1 may be acquired through power reception-side communication unit 155 and power transmission-side communication unit 101. C2=1.2×initial state C2 may be set).

Power transmission-side controller 302 controls power transmission unit 103 to try power transmission to power reception coil 154a while sequentially changing a frequency for power transmission coil 103a, again. Power transmission-side controller 302 obtains the phase difference of the primary side current with respect to the primary side voltage, for each frequency, and stores the obtained phase difference in storage 104.

Adjusting the capacitance value C2 of resonant capacity adjuster 303, and calculating and storing the phase difference of the primary side current with respect to the primary side voltage for each frequency are repeatedly performed.

For example, the capacitance value C2 is adjusted so as to be four values of 1.2×C1, 1.8×C1, C1/1.2, and C1/1.8, and the phase difference of the primary side current with respect to the primary side voltage is calculated for each frequency.

Then, regarding phase differences of the primary side current with respect to the primary side voltage for frequencies, which have been stored in storage 104, power transmission-side controller 302 specifies a capacitance value which causes the frequency range in which $\theta Tx \geq 0$ is satisfied to be widest. Power transmission-side controller 302 notifies power reception-side controller 304 of the capacitance value. Power reception-side controller 304 adjusts the capacitance value C2 of resonant capacity adjuster 303 so as to be equal to the specified capacitance value.

Thus, when the capacitance value is adjusted so as to be the capacitance value C2 which causes the frequency range in which the phase difference θTx is equal to or more than 0 to become wide, it is possible to improve the degree of freedom in selection of a driving frequency which is drivable in the phase delay region.

In the above-described example, a case where only any one of C1 and C2 is changed is described. However, it is not limited thereto. For example, power transmission-side controller 302 and power reception-side controller 304 may change both of C1 and C2 in corporation with each other.

In the above-described example, power transmission-side controller 302 mainly performs a control. However, power reception-side controller 304 may mainly perform the control.

For example, in the above-described example, power transmission device 100 includes storage 104, and power transmission-side controller 302 calculates the phase difference. However, vehicle 150 may include storage 104, and power reception-side controller 304 may calculate the phase difference for each frequency, based on the value of the primary side current and the value of the primary side voltage which have been received through power reception-side communication unit 155.

In addition, a communication unit which communicates with a separate server may be provided, and the server may, for example, calculate and store the phase difference.

A changed value of the capacitance value C1 or C2 depends on a relational expression of C1 and C2. However, a predetermined numerical value may be used as the changed value.

As described above, according to Exemplary embodiment 2, the phase difference θTx which may be changed depending on power transmission conditions such as a gap, axis deviation, a state of charge (SOC), and the like is measured. The capacitance value of the resonant capacity adjuster is adjusted so as to cause the frequency range in which the phase difference θTx is equal to or more than 0 to become wide, and thus it is possible to improve the degree of freedom in selection of a driving frequency which is drivable in the phase delay region.

In this exemplary embodiment, a case where resonant capacity adjuster 301 is provided in power transmission unit 103 and resonant capacity adjuster 303 is provided in power reception unit 154 is described.

However, the present invention is not limited thereto, and the resonant capacity adjuster may be provided any one of power transmission unit 103 and power reception unit 154.

Figure 7:
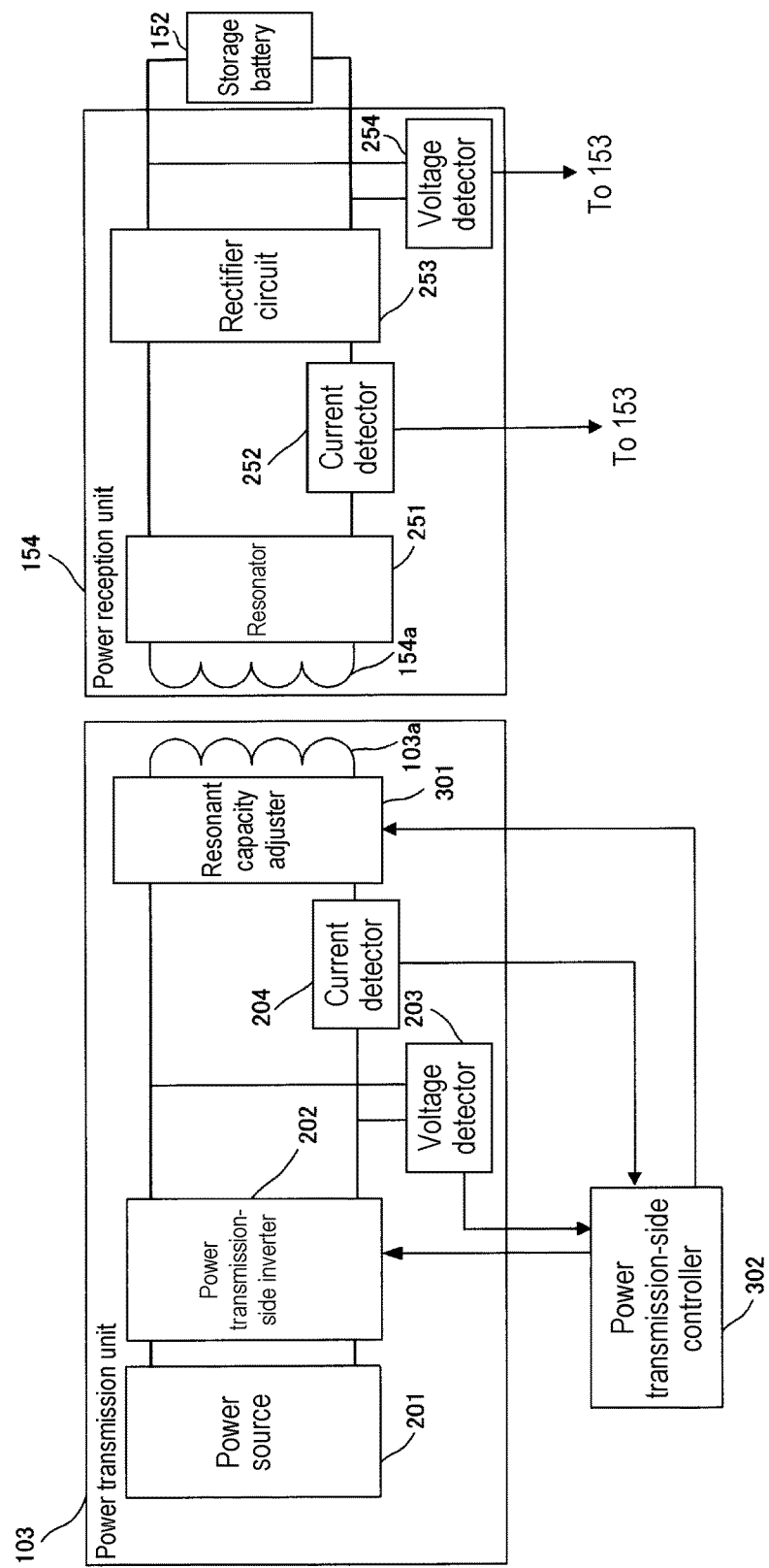
FIG. 7 is a block diagram illustrating another internal configuration of the power transmission unit and the power reception unit.
Figure 8:
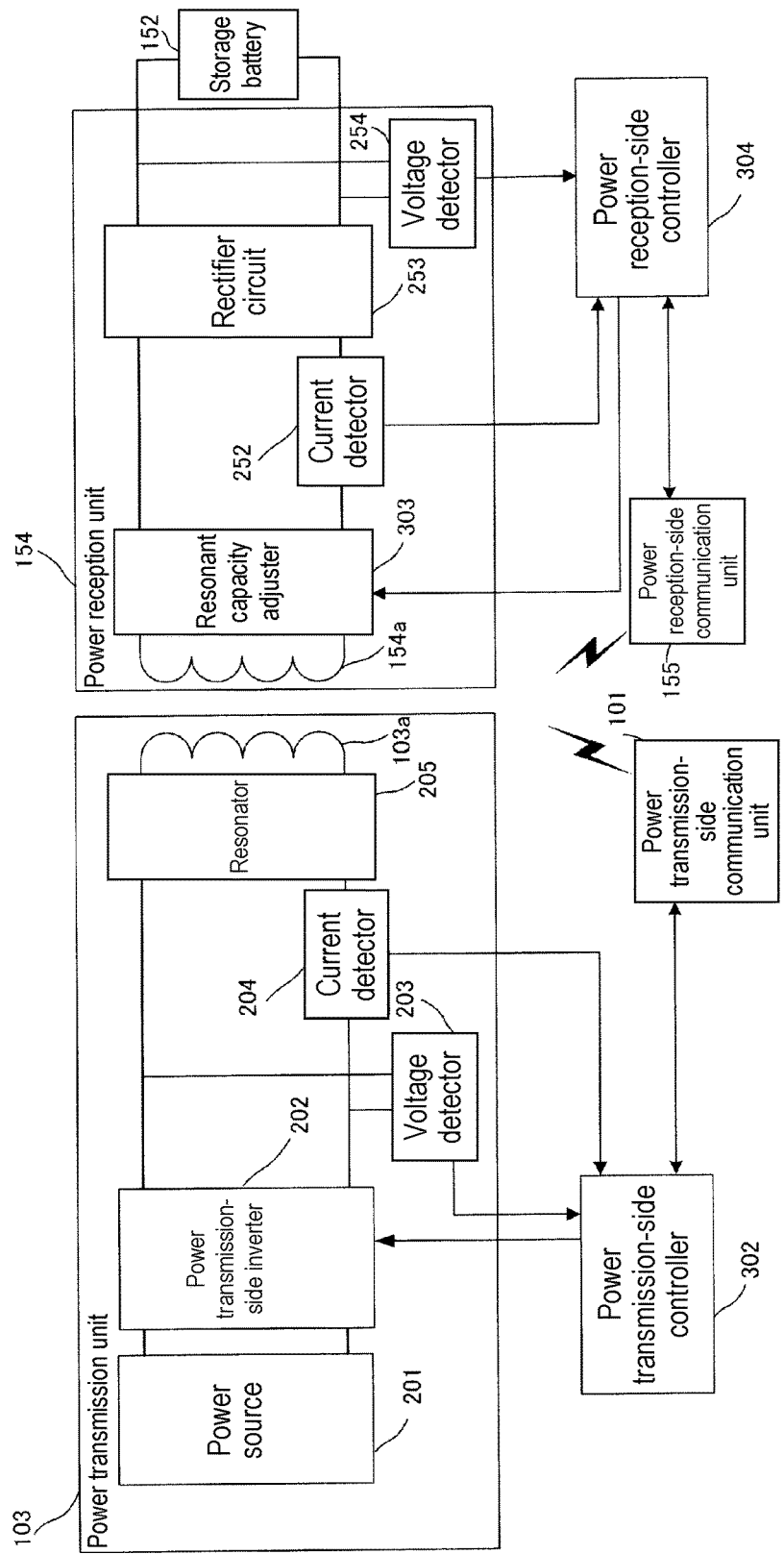
FIG. 8 is a block diagram illustrating still another internal configuration of the power transmission unit and the power reception unit.

FIG. 7 illustrates a case where resonant capacity adjuster 301 is provided in power transmission unit 103. FIG. 8 illustrates a case where resonant capacity adjuster 303 is provided in power reception unit 154.

In this exemplary embodiment, a case where resonant capacity adjusters 301 and 303 are variable capacitors is described. However, it is not limited thereto, and, for example, each of resonant capacity adjusters 301 and 303 may be configured from a plurality of capacitors which are connected to a switch and have capacitance values different from each other, and the capacitance value may be changed by switching.

In this exemplary embodiment, a case where resonant capacity adjusters 301 and 303 are provided, and the capacitance value C1 and/or the capacitance value C2 are changed is described. However, it is not limited thereto, and the inductance value L1 and/or the inductance value L2 may be changed.

For example, a separate coil may be provided so as to be in series with power transmission coil 103a and/or power reception coil 154a. A circuit which bypasses the coil and a switch for opening and closing the bypass circuit may be provided. The inductance value may be changed by switching.

In addition, a separate coil having a different inductance value may be provided in parallel with power transmission coil 103a and/or power reception coil 154a. A switch which performs switching to the coil may be provided, and the inductance value may be changed by switching.

A configuration in which the capacitance value and the inductance value are changed together may be made.

In Exemplary embodiment 1 and Exemplary embodiment 2, a case where the capacitance value C1 and the like are set or adjusted so as to cause the frequency range in which the phase difference θTx is equal to or more than 0 to be as wide as possible is exemplified. However, for example, if the driving frequency is determined, the driving frequency may be in the phase delay region (phase difference θTx is equal to or more than 0). Thus, the value may be set or adjusted to be a value (capacitance value C1 and the like) which causes the driving frequency to be in the phase delay region.

That is, the value which causes the driving frequency to be in the phase delay region may be provided. It may be not necessary that the value is set or adjusted to be a value which causes the frequency range in which the phase difference θTx is equal to or more than 0 to be widest.

<Modification Example of Coil Shape>

In the exemplary embodiments, a case where flat spiral coils are respectively used for power transmission coil 103a and power reception coil 154a is described.

However, the present invention is not limited thereto, and for example, solenoid coils may be used.

A case where solenoid coils are respectively used for power transmission coil 103a and power reception coil 154a will be described below with reference to FIGS. 9A to 9D.

FIGS. 9A to 9D illustrate states where power transmission coil 103a and power reception coil 154a are positioned, and an iron core in the coil will be omitted.

An x axis indicates a transverse direction of vehicle 150 (a +x direction indicates a rightward direction of vehicle 150, and a −x direction indicates a leftward direction of vehicle 150). A y axis indicates a forth-and-back direction of vehicle 150 (a +y direction indicates the rear of vehicle 150, and a −y direction indicates the front of vehicle 150). A z axis indicates a vertical direction to the ground (a +z direction indicates an upward direction of vehicle 150, and a −z direction indicates a downward direction of vehicle 150).

Figure 9C:
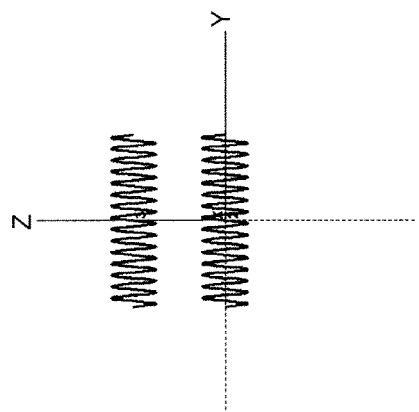
FIG. 9C is a diagram illustrating a disposition of the coils in the yz plane, when solenoid coils are used for the power transmission unit and the power reception unit.
Figure 9B:
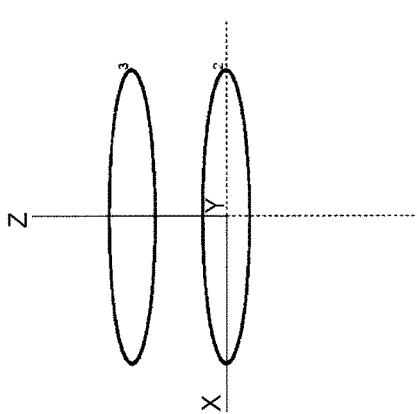
FIG. 9B is a diagram illustrating a disposition of the coils in the xz plane, when solenoid coils are used for the power transmission unit and the power reception unit.
Figure 9A:
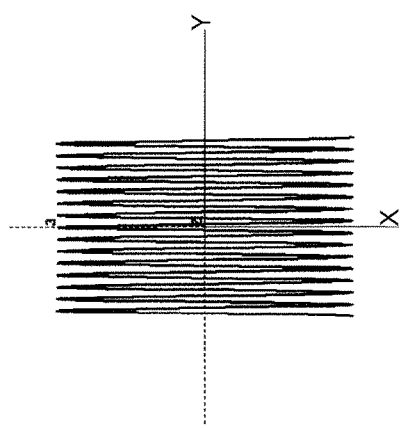
FIG. 9A is a diagram illustrating a disposition of coils in the xy plane, when solenoid coils are used for the power transmission unit and the power reception unit.

FIG. 9A illustrates the xy plane, FIG. 9B illustrates the xz plane, and FIG. 9C illustrates the yz plane.

Figure 9D:
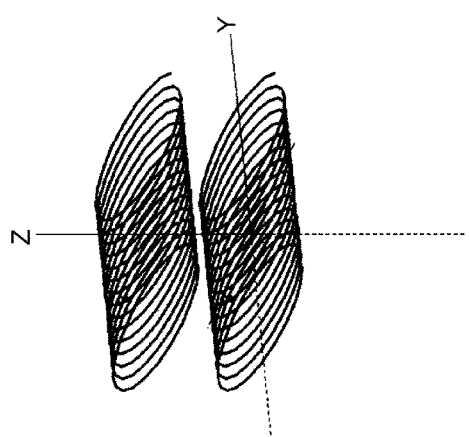
FIG. 9D is a perspective diagram illustrating the disposition of the coils when solenoid coils are used for the power transmission unit and the power reception unit.

FIG. 9D is a perspective view illustrating power transmission coil 103a and power reception coil 154a.

In this manner, solenoid coils which are respectively used for power transmission coil 103a and power reception coil 154a are disposed so as to cause the central axis to be in parallel with the ground g.

According to the present invention, the contactless power transmission device, the contactless power reception device, and the contactless power transmission system are useful for improving the degree of freedom in selection of a driving frequency.

The invention claimed is:

1. A contactless power transmission device which transmits power to a contactless power reception device including a power reception side coil and a power reception-side resonator which resonates with the power reception side coil, the device comprising:
a power transmission unit which includes
a power transmission side coil;
a transmission-side resonator that resonates with the power transmission side coil; and
an inverter that supplies power to the transmission-side resonator,
wherein at least one of an inductance value of the power transmission side coil and a capacitance value of the power transmission-side resonator is set such that a frequency range in which a phase difference of a primary side current flowing in the power transmission unit with respect to a primary side voltage applied to the power transmission unit is equal to or more than 0 is wider than the frequency range in a case where an inductance value of the power reception side coil is equal to the inductance value of the power transmission side coil and a capacitance value of the power reception-side resonator is equal to the capacitance value of the power transmission-side resonator.

2. The contactless power transmission device according to claim 1, wherein
at least one of the inductance value of the power transmission side coil and the capacitance value of the power transmission-side resonator is set to cause a minimum value of a function for the phase difference and a driving frequency to be equal to or more than 0.

3. The contactless power transmission device according to claim 1, wherein
at least one of the inductance value of the power transmission side coil and the capacitance value of the power transmission-side resonator is set to cause the phase difference to be equal to or more than 0 at a driving frequency.

4. A contactless power transmission device which transmits power to a contactless power reception device including a power reception side coil and a power reception-side resonator which resonates with the power reception side coil, the device comprising:
a power transmission unit which includes a power transmission side coil, a transmission-side resonator which resonates with the power transmission side coil, and an inverter which supplies power to the transmission-side resonator; and
a controller that controls at least one of an inductance value of the power transmission side coil and a capacitance value of the power transmission-side resonator,
wherein the controller controls at least one of the inductance value of the power transmission side coil and the capacitance value of the power transmission-side resonator such that a frequency range in which a phase difference of a primary side current flowing in the power transmission unit with respect to a primary side voltage applied to the power transmission unit is equal to or more than 0 becomes wider.

5. The contactless power transmission device according to claim 4, wherein
the controller controls at least one of the inductance value of the power transmission side coil and the capacitance value of the power transmission-side resonator, so as to cause a minimum value of a function for the phase difference and a driving frequency to be equal to or more than 0.

6. The contactless power transmission device according to claim 4, wherein,
the controller controls at least one of the inductance value of the power transmission side coil and the capacitance value of the power transmission-side resonator, so as to cause the phase difference to be equal to or more than 0 at a driving frequency.

7. The contactless power transmission device according to claim 4, wherein,
the controller sequentially changes at least one of the inductance value of the power transmission side coil and the capacitance value of the power transmission-side resonator, obtains the phase difference for each frequency, and controls at least one of the inductance value of the power transmission side coil and the capacitance value of the power transmission-side resonator so as to be at least one of the inductance value and the capacitance value when a frequency range in which the phase difference among phase differences at frequencies, which have been obtained, is equal to or more than 0 is wide.

8. The contactless power transmission device according to claim 4, wherein,
the power transmission-side resonator is a variable capacitor, and
the controller controls the capacitance value of the power transmission-side resonator so as to cause the frequency range in which the phase difference is equal to or more than 0 to become wider.

9. A contactless power reception device which receives power from a contactless power transmission device including a power transmission unit which includes a power transmission side coil, a transmission-side resonator which resonates with the power transmission side coil, and an inverter which supplies power to the transmission-side resonator, the device comprising:
a power reception side coil; and
a power reception-side resonator that resonates with the power reception side coil,
wherein at least one of an inductance value of the power reception side coil and a capacitance value of the power reception-side resonator is set such that a frequency range in which a phase difference of a primary side current flowing in the power transmission unit with respect to a primary side voltage applied to the power transmission unit is equal to or more than 0 is wider than the frequency range in a case where the inductance value of the power reception side coil is equal to an inductance value of the power transmission side coil and the capacitance value of the power reception-side resonator is equal to a capacitance value of the power transmission-side resonator.

10. The contactless power reception device according to claim 9, wherein
at least one of the inductance value of the power reception side coil and the capacitance value of the power reception-side resonator is set to cause a minimum value of a function for the phase difference and a driving frequency to be equal to or more than 0.

11. The contactless power reception device according to claim 9, wherein
at least one of the inductance value of the power reception side coil and the capacitance value of the power reception-side resonator is set to cause the phase difference to be equal to or more than 0 at a driving frequency.

12. A contactless power reception device which receives power from a contactless power transmission device including a power transmission unit which includes a power transmission side coil, a transmission-side resonator which resonates with the power transmission side coil, and an inverter which supplies power to the transmission-side resonator, the device comprising:
- a power reception side coil;
- a power reception-side resonator that resonates with the power reception side coil; and
- a controller that controls at least one of an inductance value of the power reception side coil and a capacitance value of the power reception-side resonator, wherein
- the controller controls at least one of the inductance value of the power reception side coil and the capacitance value of the power reception-side resonator such that a frequency range in which a phase difference of a primary side current flowing in the power transmission unit with respect to a primary side voltage applied to the power transmission unit is equal to or more than 0 becomes wider.

13. The contactless power reception device according to claim 12, wherein
the controller controls at least one of the inductance value of the power reception side coil and the capacitance value of the power reception-side resonator, so as to cause a minimum value of a function for the phase difference and a driving frequency to be equal to or more than 0.

14. The contactless power reception device according to claim 12, wherein
the controller controls at least one of the inductance value of the power reception side coil and the capacitance value of the power reception-side resonator, so as to cause the phase difference to be equal to or more than 0 at a driving frequency.

15. The contactless power reception device according to claim 12, wherein
the controller sequentially changes at least one of the inductance value of the power reception side coil and the capacitance value of the power reception-side resonator, obtains the phase difference for each frequency, and controls at least one of the inductance value of the power reception side coil and the capacitance value of the power reception-side resonator so as to be at least one of the inductance value and the capacitance value when a frequency range in which the phase difference among phase differences at frequencies, which have been obtained, is equal to or more than 0 is wide.

16. The contactless power reception device according to claim 12, wherein
the power reception-side resonator is a variable capacitor, and
the controller includes a controller that controls the capacitance value of the power reception-side resonator, in order to cause the frequency range in which the phase difference is equal to or more than 0 to become wide.

17. A contactless power transmission system comprising:
a contactless power reception device; and
a contactless power transmission device that transmits power to the contactless power reception device,
wherein the contactless power transmission device includes
a power transmission unit including
a power transmission side coil,
a transmission-side resonator that resonates with the power transmission side coil, and
an inverter that supplies power to the transmission-side resonator,
the contactless power reception device includes
a power reception side coil, and
a power reception-side resonator that resonates with the power reception side coil, and
an inductance value of the power transmission side coil, a capacitance value of the power transmission-side resonator, an inductance value of the power reception side coil, and a capacitance value of the power reception-side resonator are set such that a frequency range in which a phase difference of a primary side current flowing in the power transmission unit with respect to a primary side voltage applied to the power transmission unit is equal to or more than 0 is wider than the frequency range in a case where an inductance value of the power reception side coil is equal to an inductance value of the power transmission side coil and the capacitance value of the power reception-side resonator is equal to the capacitance value of the power transmission-side resonator.

* * * * *